(12) United States Patent
Radha et al.

(10) Patent No.: US 11,948,367 B2
(45) Date of Patent: Apr. 2, 2024

(54) MULTI-OBJECT TRACKING FOR AUTONOMOUS VEHICLES

(71) Applicant: Board of Trustees of Michigan State University, East Lansing, MI (US)

(72) Inventors: Hayder Radha, East Lansing, MI (US); Su Pang, Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 287 days.

(21) Appl. No.: 17/350,107

(22) Filed: Jun. 17, 2021

(65) Prior Publication Data

US 2022/0405513 A1   Dec. 22, 2022

(51) Int. Cl.
| | |
|---|---|
| *G06V 20/56* | (2022.01) |
| *B60W 50/00* | (2006.01) |
| *B60W 60/00* | (2020.01) |
| *G06F 18/22* | (2023.01) |
| *G06F 18/24* | (2023.01) |
| *G06T 7/20* | (2017.01) |
| *G06V 10/22* | (2022.01) |
| *G06V 10/44* | (2022.01) |

(52) U.S. Cl.
CPC .............. *G06V 20/56* (2022.01); *B60W 50/00* (2013.01); *B60W 60/001* (2020.02); *G06F 18/22* (2023.01); *G06F 18/24* (2023.01); *G06T 7/20* (2013.01); *G06V 10/22* (2022.01); *G06V 10/443* (2022.01); *B60W 2050/0043* (2013.01); *B60W 2420/42* (2013.01); *B60W 2420/52* (2013.01); *G06T 2207/30252* (2013.01)

(58) Field of Classification Search
CPC ...... G06V 20/56; G06V 10/22; G06V 10/443; G06V 20/05; B60W 50/00; B60W 60/001; B60W 2050/0043; B60W 2420/42; B60W 2420/52; G06F 18/22; G06F 18/24; G06T 7/20; G06T 2207/30252
See application file for complete search history.

(56) References Cited

PUBLICATIONS

Bohnsack, Erik, and Adam Lilja. "Multi-object tracking using either end-to-end deep learning or PMBM filtering." Master's thesis (2019). (Year: 2019).*

Chabot, et al., Deep Manta: A Coarse-to-Fine Many-Task Network for Joint 2D and 3D Vehicle Analysis from Monocular Image, 2017 IEEE Conference on Computer Vision and Pattern Recognition (CVPR), 2017, https://doi.org/10.1109/cvpr.2017.198.

Mousavian, et al., 3D Bounding Box Estimation Using Deep Learning and Geometry, 2017 IEEE Conference on Computer Vision and Pattern Recognition (CVPR), 2017, https://doi.org/10.1109/cvpr.2017.597.

(Continued)

*Primary Examiner* — Amandeep Saini
*Assistant Examiner* — Denise G Alfonso
(74) *Attorney, Agent, or Firm* — Harness, Dickey & Pierce, PLC (57) ABSTRACT

A method and system for multi-object tracking is set forth. Object data for boundaries of a plurality of objects are received. Poisson multi-Bernoulli mixture filtering is performed on the object data to form a filtered set of object data. Ultimately, the filtered set of object data is used to control the operation of the vehicle. Identifiers and probabilities are associated with the objects to reduce the set of object data.

20 Claims, 5 Drawing Sheets

(56) References Cited

PUBLICATIONS

Vo, et al., A Random Finite Set Conjugate Prior and Application to Multi-Target Tracking, 2011 Seventh International Conference on Intelligent Sensors, Sensor Networks and Information Processing, 2011, pp. 431-436, https://doi.org/10.1109/issnip.2011.6146549.

Garcia-Fernandez, et al., Poisson multi-Bernoulli mixture filter: direct derivation and implementation, IEEE Transactions on Aerospace and Electronic Systems, arXiv:1703.04264v1 [cs.CV], 17 pages, Mar. 13, 2017.

Xia, et al., Performance Evaluation of Multi-Bernoulli Conjugate Priors for Multi-Target Filtering, 2017 20th International Conference on Information Fusion (Fusion), 2017, https://doi.org/10.23919/icif.2017.8009710.

Papi, et al., Multi-Target Track-before-Detect Using Labeled Random Finite Set, 2013 International Conference on Control, Automation and Information Sciences (ICCAIS), 2013, https://doi.org/10.1109/iccais.2013.6720540.

Emami, et al.,Machine Learning Methods for Solving Assignment Problems in Multi-Target Tracking. 1, 1 (Feb. 2018), 35 pages. https://doi.org/0000001.0000001.

Bernardin, et al., Evaluating Multiple Object Tracking Performance: The Clear Mot Metrics, EURASIP Journal on Image and Video Processing, vol. 2008, Apr. 23, 2008, pp. 1-10, https://doi.org/10.1155/2008/246309.

Murty, (1968) Letter to the Editor-An Algorithm for Ranking all the Assignments in Order of Increasing Cost, Operations Research 16(3):682-687, https://doi.org/10.1287/opre.16.3.682.

Zhou, et al., VoxelNet: End-to-End Learning for Point Cloud Based 3D Object Detection, 2018 IEEE/CVF Conference on Computer Vision and Pattern Recognition, 2018, https://doi.org/10.1109/cvpr.2018.00472.

Yang, et al., STD: Sparse-to-Dense 3D Object Detector for Point Cloud, 2019 IEEE/CVF International Conference on Computer Vision (ICCV), 2019, https://doi.org/10.1109/iccv.2019.00204.

Yan, et al., Second: Sparsely Embedded Convolutional Detection, Sensors, vol. 18, No. 10, Oct. 6, 2018, p. 3337., https://doi.org/10.3390/s18103337.

Nair, et al., Rectified Linear Units Improve Restricted Boltzmann Machines, Proceedings of the 27th International Conference on Machine Learning, Israel, 2010, 8 pages.

Shi, et al., PV-RCNN: Point-Voxel Feature Set Abstraction for 3D Object Detection, 2020 IEEE/CVF Conference on Computer Vision and Pattern Recognition (CVPR), 2020, https://doi.org/10.1109/cvpr42600.2020.01054.

You, et al., Pseudo lidar ++ Accurate depth for 3d object detection in autonomous driving, ICLR 2020, arXiv:1906.06310v3 [cs.CV], Feb. 15, 2020.

Shi, et al., Pointrcnn: 3D Object Proposal Generation and Detection from Point Cloud, 2019 IEEE/CVF Conference on Computer Vision and Pattern Recognition (CVPR), 2019, https://doi.org/10.1109/cvpr.2019.00086.

Lang, et al., Pointpillars: Fast Encoders for Object Detection from Point Clouds, 2019 IEEE/CVF Conference on Computer Vision and Pattern Recognition (CVPR), 2019, https://doi.org/10.1109/cvpr.2019.01298.

Qi, et al., PointNet: Deep Learning on Point Sets for 3D Classification and Segmentation, 2017 IEEE Conference on Computer Vision and Pattern Recognition (CVPR), 2017, https://doi.org/10.1109/cvpr.2017.16.

Xu,, et al., Pointfusion: Deep Sensor Fusion for 3D Bounding Box Estimation, 2018 IEEE/CVF Conference on Computer Vision and Pattern Recognition, 2018, https://doi.org/10.1109/cvpr.2018.00033.

Ren, et al., Faster R-CNN: Towards Real-Time Object Detection with Region Proposal Networks, IEEE Transactions on Pattern Analysis and Machine Intelligence, vol. 39, No. 6, 2017, pp. 1137-1149., https://doi.org/10.1109/tpami.2016.2577031.

Chen, et al. Multi-View 3D Object Detection Network for Autonomous Driving, 2017 IEEE Conference on Computer Vision and Pattern Recognition (CVPR), 2017, https://doi.org/10.1109/cvpr.2017.691.

Liang, et al., Multi-Task Multi-Sensor Fusion for 3D Object Detection, 2019 IEEE/CVF Conference on Computer Vision and Pattern Recognition (CVPR), 2019, https://doi.org/10.1109/cvpr.2019.00752.

Lin, et al., Feature Pyramid Networks for Object Detection, 2017 IEEE Conference on Computer Vision and Pattern Recognition (CVPR), 2017, https://doi.org/10.1109/cvpr.2017.106.

Ku, et al., Joint 3D Proposal Generation and Object Detection from View Aggregation, 2018 IEEE/RSJ International Conference on Intelligent Robots and Systems (IROS), 2018, https://doi.org/10.1109/iros.2018.8594049.

Qi, et al., Frustum Pointnets for 3D Object Detection from RGB-D Data, 2018 IEEE/CVF Conference on Computer Vision and Pattern Recognition, 2018, https://doi.org/10.1109/cvpr.2018.00102.

Wang, et al., Frustum ConvNet: Sliding Frustums to Aggregate Local Point-Wise Features for Amodal 3D Object Detection, 2019 IEEE/RSJ International Conference on Intelligent Robots and Systems (IROS), 2019, https://doi.org/10.1109/iros40897.2019.8968513.

Shi, et al., From Points to Parts: 3D Object Detection from Point Cloud with Part-Aware and Part-Aggregation Network, IEEE Transactions on Pattern Analysis and Machine Intelligence, 2020, pp. 1-1, https://doi.org/10.1109/tpami.2020.2977026.

Lin, et al., Focal Loss for Dense Object Detection, 2017 IEEE International Conference on Computer Vision (ICCV), 2017, https://doi.org/10.1109/iccv.2017.324.

Chen, et al., Fast Point R-CNN, 2019 IEEE/CVF International Conference on Computer Vision (ICCV), 2019, https://doi.org/10.1109/iccv.2019.00987.

Liang, et al., Deep Continuous Fusion for Multi-Sensor 3D Object Detection, Computer Vision, ECCV 2018, 2018, pp. 663-678, https://doi.org/10.1007/978-3-030-01270-0_39.

Cai, et al., Cascade R-CNN: High Quality Object Detection and Instance Segmentation, IEEE Transactions on Pattern Analysis and Machine Intelligence, vol. 43, No. 5, 2021, pp. 1483-1498, https://doi.org/10.1109/tpami.2019.2956516.

Geiger, et al., Are We Ready for Autonomous Driving? The Kitti Vision Benchmark Suite, 2012 IEEE Conference on Computer Vision and Pattern Recognition, 2012, https://doi.org/10.1109/cvpr.2012.6248074.

Ren, et al., Accurate Single Stage Detector Using Recurrent Rolling Convolution, 2017 IEEE Conference on Computer Vision and Pattern Recognition (CVPR), 2017, https://doi.org/10.1109/cvpr.2017.87.

Mottaghi, et al., A Coarse-to-Fine Model for 3D Pose Estimation and Sub-Category Recognition, 2015 IEEE Conference on Computer Vision and Pattern Recognition (CVPR), 2015, https://doi.org/10.1109/cvpr.2015.7298639.

Chen, et al., 3D Object Proposals for Accurate Object Class Detection, Advances in Neural Information Processing Systems 28, NIPS, pp. 1-9, 2015.

Wang, et al., Pseudo-Lidar from Visual Depth Estimation: Bridging the Gap in 3D Object Detection for Autonomous Driving, 2019 IEEE/CVF Conference on Computer Vision and Pattern Recognition (CVPR), 2019, https://doi.org/10.1109/cvpr.2019.00864.

* cited by examiner

MULTI-OBJECT TRACKING FOR AUTONOMOUS VEHICLES

TECHNICAL FIELD

The present disclosure relates generally to autonomous vehicles, and more specifically, to a method and system for tracking multiple objects.

BACKGROUND

The statements in this section merely provide background information related to the present disclosure and does not constitute prior art.

Vehicle-accident related facilities, especially those caused by human errors, exceed more than 1 million every year worldwide. Various types of safety measures have proposed by various governmental jurisdictions to reduce the amount of accidents. Autonomous vehicles that are properly equipped are one way to reduce the amount of accidents. Autonomous vehicles typically have a number of sensors that are used for detecting nearby elements within a field of view or surveillance area. Based upon the characterization of the various components, the vehicle may make evasive maneuvers to avoid an accident.

Multi-object tracking (MOT) is one component used in autonomous vehicles. Multi-object tracking provides the autonomous vehicle with an essential tool for safety planning and navigation in cluttered environments. The challenge for multi-object tracking is the uncertainty with respect to the number of objects, where and when the objects may appear and disappear, and uncertainties in the object states.

Some filtering techniques, such as Kalman filtering are used for discriminating some of the uncertainties. Kalman filtering performs well in state updates and estimations but cannot effectively model the unknown number of objects and birth and death phenomena of various objects. Random finite set analysis used with respect to multi-object tracking has also been used. However, such systems have not been effective to identify lidar and/or 2D and 3D detections.

SUMMARY

The present disclosure provides improves multi-object tracking by reducing the amount of data for processing based on object identifiers, continuation of movement and filtering using probabilities determined during filtering.

In one aspect of the disclosure, a system for multi-object tracking is set forth. Object data for boundaries of a plurality of objects are received. Poisson multi-Bernoulli mixture filtering is performed on the object data to form a filtered set of object data. Ultimately, the filter set of object data is used to control the operation of the vehicle. Identifiers and probabilities are associated with the objects to reduce the set of object data.

In a further aspect of the disclosure, a meth comprises storing previous detected object data and previous undetected object data, receiving new object data associated with a timestamp, comparing the new object data, the detected object data and the undetected object data, forming hypotheses from the step of comparing, each hypotheses having hypothesis probability, generating first probability data for each detected object, generating second probability data for each undetected object, reducing the hypotheses based on the hypotheses probability, generating a first set of data comprising detected objects, undetected objects and hypotheses, reducing the first set of data comprising the detected objects and undetected objects based on the first probability, the second probability and the hypothesis probabilities to form a second set and utilizing the second set to control operation of a vehicle system.

In yet another aspect of the disclosure, a system comprises a camera sensor generating camera data, a lidar generating lidar data and a bounding box determination module generating bounding boxes from the camera data and the lidar data. A multiple object tracking module is programmed to store previous detected object data and previous undetected object data, receive new object data associated with a timestamp, compare the new object data, the detected object data and the undetected object data, form hypotheses from the step of comparing, each hypotheses having hypothesis probability, generate first probability data for each detected object, generate second probability data for each undetected object, reduce the hypotheses based on the hypotheses probability, generate a first set of data comprising detected objects, undetected objects and hypotheses, reduce the first set of data comprising the detected objects and undetected objects based on the first probability, the second probability and the hypothesis probabilities to form a second set and utilize the second set to control operation of a vehicle system.

Further areas of applicability of the teachings of the present disclosure will become apparent from the detailed description, claims and the drawings provided hereinafter, wherein like reference numerals refer to like features throughout the several views of the drawings.

DRAWINGS

The drawings described herein are for illustration purposes only and are not intended to limit the scope of the present disclosure in any way.

DETAILED DESCRIPTION

Example embodiments will now be described more fully with reference to the accompanying drawings.

Figure 1:
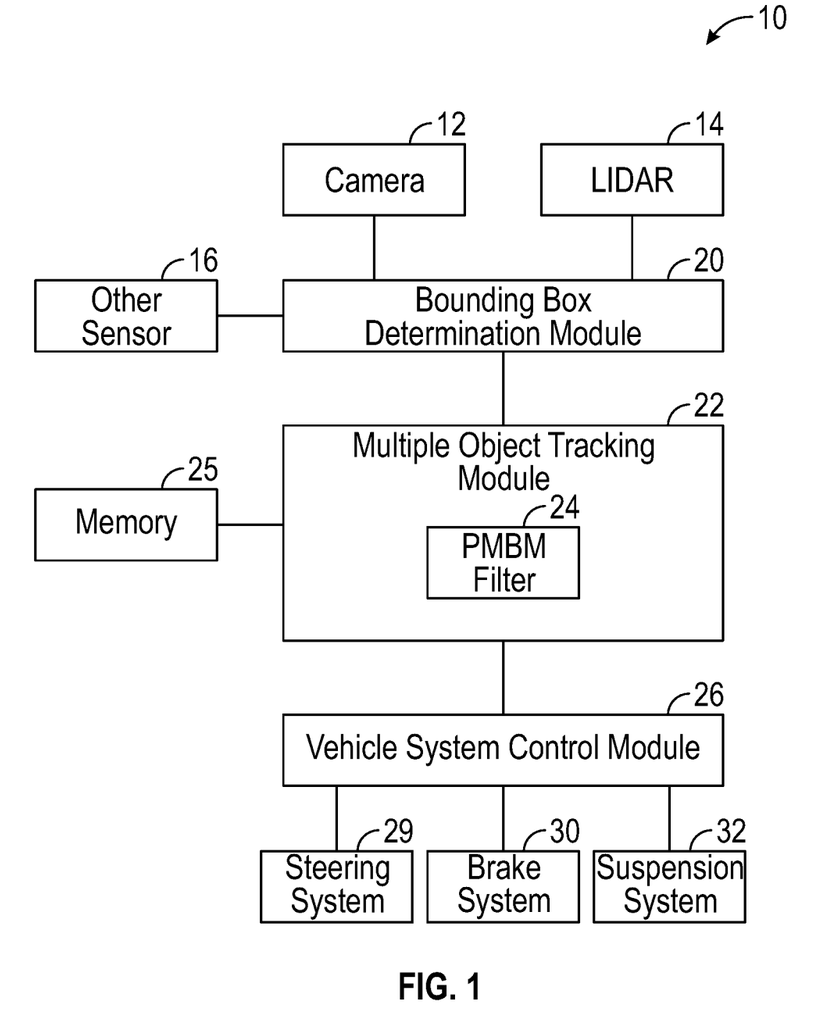
FIG. 1 is a block diagrammatic view of the vehicle according to the present disclosure.

Referring now to FIG. 1, an autonomous vehicle system 10 is illustrated. The autonomous vehicle system 10 includes a camera 12, lidar 14 and other vehicle sensors 16. The camera 12 is used to obtain two dimensional image data. The lidar 14 is used to obtain three dimensional image data. Other sensors 16 may include various types of sensors used in autonomous vehicles and other control systems of the vehicle. The other sensors 16 may include radar and vehicle feedback sensors, such as steering wheel angle sensors, braking sensors, attitude and acceleration sensors, safety system sensors and the like.

The camera sensor 12, the lidar sensor 14 and the other sensors 16 may occur singular or in a plurality to the bounding box determination module 20. The bounding box determination module 20 provides a multi-object tracking module with various types of data derived from the sensors 12, 14 and 16. The bounding box determination module 20 may provide a length, width, height and orientation/heading of a particular object. Likewise, the bounding box determination module 20 may provide a center and the velocity of the center of movement in various directions such as in the X direction, Y direction and possibly the Z direction.

In the operation of autonomous vehicles, the ability to process the data in a reasonable amount of time so that computations and evasive actions may take place is important. The bounding box determination provides movement of an object relative to a center. However, some of the objects may or may not be actual objects and therefore false positives may be provided. Tracking of objects in an actual environment has many variables and therefore limiting the amount of objects using filtering is important. In this example, a Poisson multi-Bernoulli mixture (PMBM) filter 24 is used. Details of the module are provided below. A memory 25 may be used to store various parameters such as received bounding boxes, determined probabilities and hypotheses. The PMBM filter 24 provides a vehicle system control module 26 with vehicle data so that the vehicle system control module 26 may be used to control the trajectory of the vehicle by controlling such systems such as a steering system 28, a braking system 30 and a suspension system 32 may be performed. Of course, other types of vehicle systems such as passenger restraint systems and the like may also be controlled by the vehicle system control module 26.

Figure 2A:
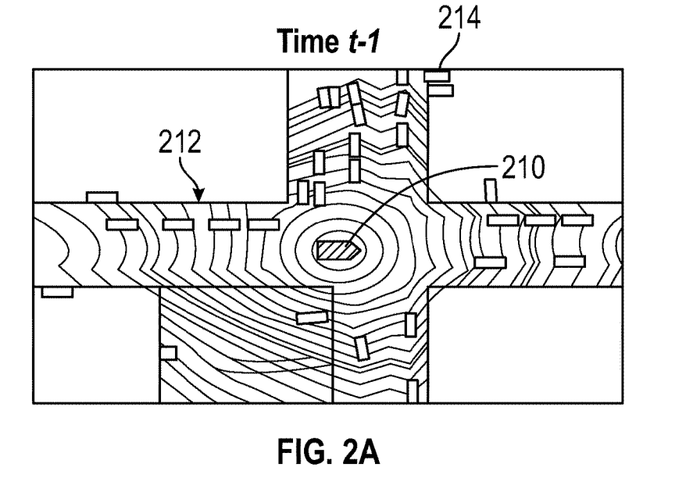
FIGS. 2A and 2B are bounding boxes relative to a surveillance area for a time t−1 in FIG. 2A and t at time t.
Figure 2B:
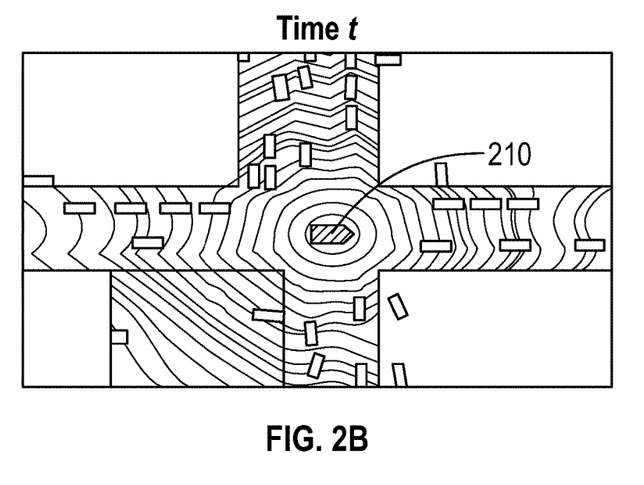

Referring now to FIGS. 2A and 2B, a reference vehicle 210 is illustrated in a street scene in two different positions at two different times, time t−1 and time t. FIGS. 2A and 2B illustrate a plurality of bounding boxes 212 that provided from a conventional detection measurement system without the use of multiple object tracking as set forth in the present disclosure.

Figure 3A:
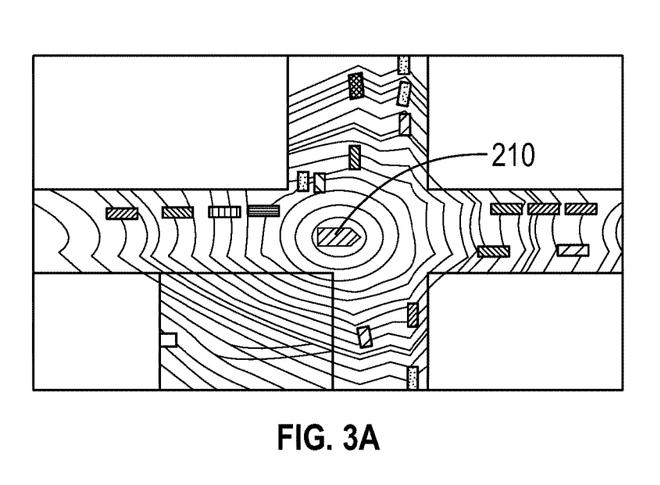
FIG. 3A is a diagram of tracked targets according to the present disclosure at time t.
Figure 3B:
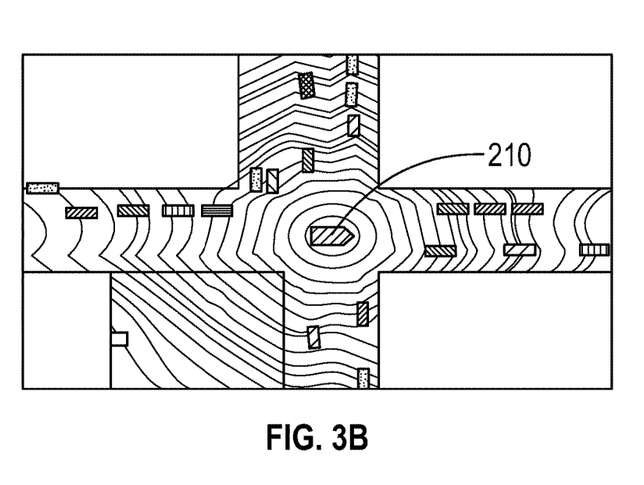
FIG. 3B is a tracked target view of the targets at time t.

Referring now also to FIGS. 3A and 3B, the vehicle 210 is illustrated in the two positions set forth in FIGS. 2A and 2B, respectively. However, multiple object tracking as will be described in more detail below has been applied. Extraneous bounding boxes such as the bounding boxes 214 of FIG. 2A do not appear in FIG. 3A. The extraneous bounding boxes in FIGS. 2A and 2B have be false positives. In FIGS. 3A and 3B, the bounding boxes have different identifiers and are therefore drawn uniquely to correspond to the unique tracked identifiers that have been assigned thereto as will be described in more detail below.

Figure 3C:
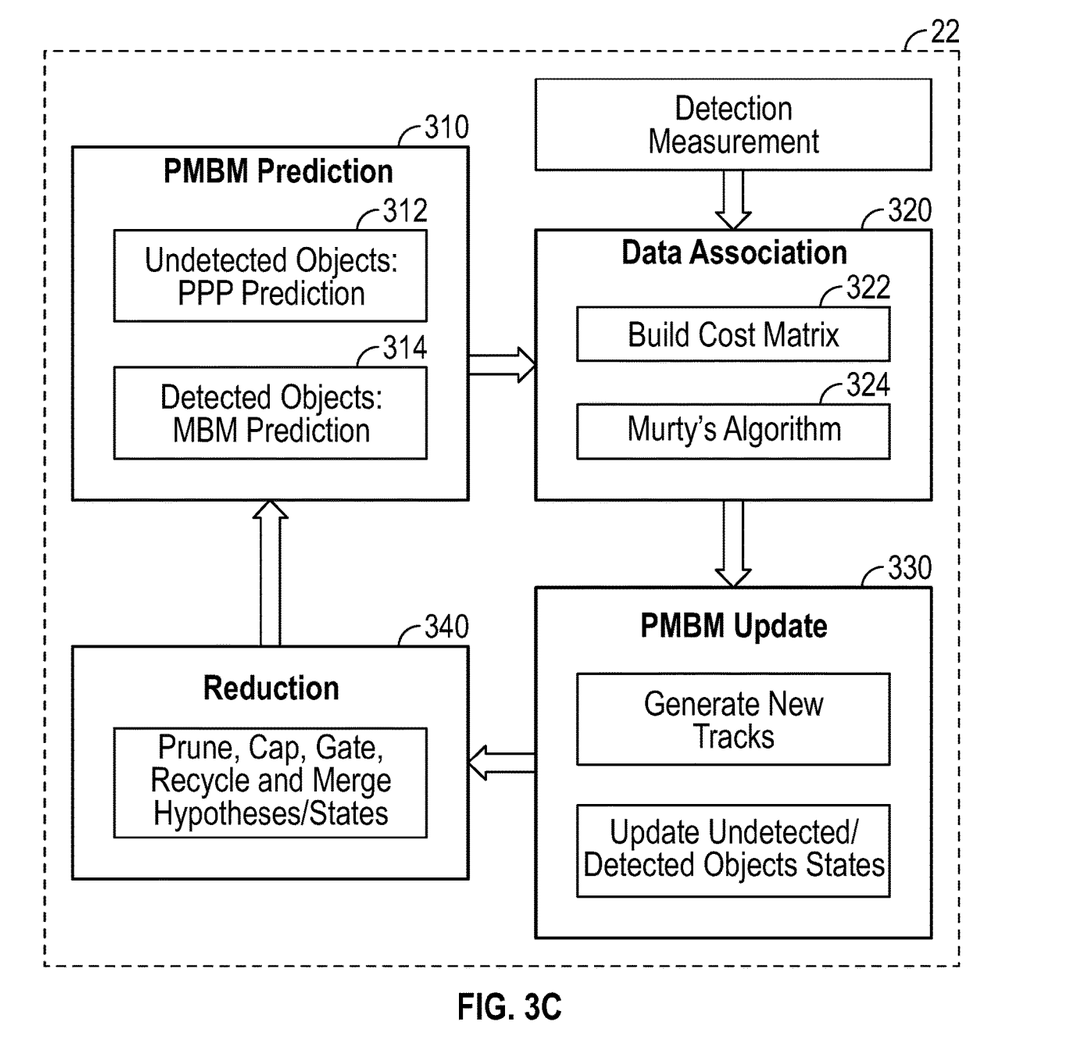
FIG. 3C is a block diagrammatic view of the multiple object tracking module 22 in further detail.

Referring now to FIG. 3C, the high-level system of the proposed PMBM MOT tracking module is shown. The PMBM filter 24 is able to track objects based on a Bayesian framework, and it models undetected objects and detected objects using two distinct probability distributions. As shown in FIG. 3, the tracking module 22 consists of four primary components a PMBM prediction module 310, a data association module 320 a PMBM update module 330 and a reduction module 340.

The object states are defined as X=[x, y, vx, vy], where x and y represent the two dimensional (2D) location of the object and v_x and v_y are the velocities along x and y directions, respectively. The states are defined in this example without using the vertical values z because: first, the z value does not change dramatically for consecutive frames; second, the dimension of the objects are already precise as received from the bounding box determination module 20; therefore, it is not necessary to incorporate all three-dimensional (3D) information; third, reducing the state dimension inherently enables the tracking system operate at a lower computational cost for real-time performance. As set forth herein, the PMBM tracking module 22 is designed as a point-based tracker. The center points of the objects, which are received from the bounding box determination module 20 of FIG. 1, are tracked using unique tracked IDs, while the bounding box dimensions (height, width, length) are directly extracted from the detection measurements.

An undetected object module 312 and a detected object module 314 are set forth within the PMBM prediction module 310. Under the PMBM model, the set of objects $x_t$ at timestamp t is the union of detected objects $x_t^d$ and undetected objects $x_t^u$. Detected objects $x_t^d$ are objects that have been detected at least once. Undetected objects $x_t^u$ are objects that are not detected. Undetected objects are not explicitly tracked, which is impossible under a tracking-by-detection framework. Instead, a representation of their possible existences is used to account therefor. For example, if an autonomous vehicle is under a scenario where a large truck blocks part of the view, it is possible that some objects are located in the occluded area behind the truck, and hence, these objects are inherently undetected. Ultimately the output of the system is a reduced set of objects (as compared to those provided from the bounding box determination module 20) that have a high probability of being actual. Each object in the filtered set has x, and y coordinates, the velocities $v_x$ and $v_y$ and other data that may be passed along from the bounding box determination module 20.

For each timestamp, there are multiple hypotheses for data association at the data association module 320. For the measurement-driven framework, each measurement is a single target hypothesis and is either a newly detected target, a previously detected target, or a false positive detection. Different global association hypotheses are formed from possible combinations of the single target hypothesis (STH). The association correspond to possibilities based on the provided data and the data from a previous frame. Gating is used at the calculation of cost matrix 322 to reduce the total number of hypotheses and only keeps reasonable ones. Murty's algorithm 324, an extension of the Hungarian algorithm, or another type of algorithm may be used to generate K best global hypotheses instead of only one. The global hypotheses all have a cost associated with them corresponds to a probability. Some hypotheses are highly unlikely due to the physical movements to a vehicle.

Under the PMBM model, Poisson RFS, also named as Poisson point process (PPP) is used to represent undetected objects in the undetected object module, and multi-Bernoulli mixture (MBM) RFS to represent detected objects in the detected object module. The PMBM density is defined as follows:

$$\mathcal{PMBM}_t(x) = \sum_{x^u \uplus x^d = x} \mathcal{P}_t(x^u)\mathcal{MBM}_t(x^d)$$

where x represents all the objects in the surveillance area, and where x is the disjoint union set of undetected objects $x^u$ and detected objects $x^d$. $P(\bullet)$ and $MBM(\bullet)$ are the Poisson point process density and multi-Bernoulli mixture density, respectively.

One aspect of the PMBM filter 24 is its conjugacy property. The notion of conjugacy is allowing robust and accurate Bayesian-based MOT. The conjugacy of the PMBM filter implies that if the prior is in a PMBM form, then the distribution after the Bayesian prediction and update steps will be of the same distribution form. Therefore, the prediction stage of a PMBM filter can be written as:

$$\mathcal{PMBM}_{t+1|t}(x_{t+1}) = \int p(x_{t+1}|x_t) \mathcal{PMBM}_{t|t}(x_t) \delta x_t$$

where $p(x_{t+1}|x_t)$ represents the transition density. Constant velocity model is used as the motion model in this work for simplicity. Under the PMBM filter, undetected and detected objects can be predicted independently. $P_s$ as the probability of survival, which models the probability that an object survives from one time step to the next. For undetected objects, the predicted parameters consist of predicted parameters from the previous timestamp and PPP birth parameters. The weight of each undetected object is scaled by $P_s$ in the prediction step. For detected objects, which are modeled as multi-Bernoulli mixture RFSs, each multi-Bernoulli (MB) process can also be predicted independently of the other MB processes. The probability of existence for each MB-modeled object is decreased by a factor $P_s$ in order to account for the higher uncertainty of existence within the prediction stage.

Furthermore, by adding information from the measurement model $p(z_t|x_t)$, the PMBM density can be updated with:

$$\mathcal{PMBM}_{t+1|t+1}(x_{t+1}) = \frac{p(z_{t+1}|x_{t+1})\mathcal{PMBM}_{t+1|t}(x_{t+1})}{\int p(x_{t+1}|x'_{t+1})\mathcal{PMBM}_{t+1|t}(x'_{t+1})\delta x'_t}$$

In the update step, the undetected objects that do not have any measurement associated with them remain undetected. The Bayesian update will thus not change the states or variances of the Poisson distributions since no new information is added. Here $P_d$ is defined as the probability of detection, which models an object ought to be detected with that probability. For undetected objects without measurement associated, the weight is thus decreased with a factor $(1-P_d)$ as to account for the decreased probability of existing. For detected object, the predicted state is updated by weighting in the information contained in the measurement.

There are two different types of updates for detected objects: the objects being detected for the first time and the detected objects from the previous timestamp. Our tracker is a measurement-driven framework: an object must be connected to a measurement in order to be classified as detected for the first time. All the undetected PPP intensity components and corresponding gated measurements are considered to generate the fused distribution. Note that the detections provided from a neural network always have confidence scores attached to them. This confidence score is an invaluable indicator of the object probability of existence. So unlike a standard PMBM filter, the detection confidence score is incorporated into the update step of objects detected for the first time. A new Bernoulli process for each first-time detected object is determined. As for detected objects from the previous timestamp, if there are measurements associated with them, then for each hypothesis, a standard Kalman filter is used to update the state vector, the updated probability of existence is set to 1 because one cannot associate a measurement to an object that does not exist; if there is no measurement associated with an object, which was detected from a previous frame, then the object predicted state is unchanged.

Furthermore, the probability of existence and weight is decreased with $(1-P_d)$. $P_d$ is related to the associated detection confidence score in the past frames. Here, unlike other standard Kalman filter based trackers, the survival time of detected objects without measurement varies based on the tracking status from the previous time period.

The assignment problem in MOT will theoretically become NP-hard, and hence, the reduction of the number of hypotheses is necessary for decreasing the computational complexity and maintain real-time performance. Five reduction techniques for reducing the number of objects and hypotheses are used: pruning, capping, gating, recycling and merging. Pruning is used to remove objects and global hypotheses with low weights or probabilities (high cost). Capping is used to set an upper bound for the number of global hypotheses and detected objects. Gating refers to limiting the search distance for data association, and where Mahalanobis distance is used here instead of Euclidean distance. Recycling is applied to detected objects with lower probability of existence. In that context, instead of discarding these objects, they are recycled by moving them from detected object set to undetected object set. There may be non-unique global hypotheses, and hence, merging would merge these identical global hypotheses into one.

Figure 4:
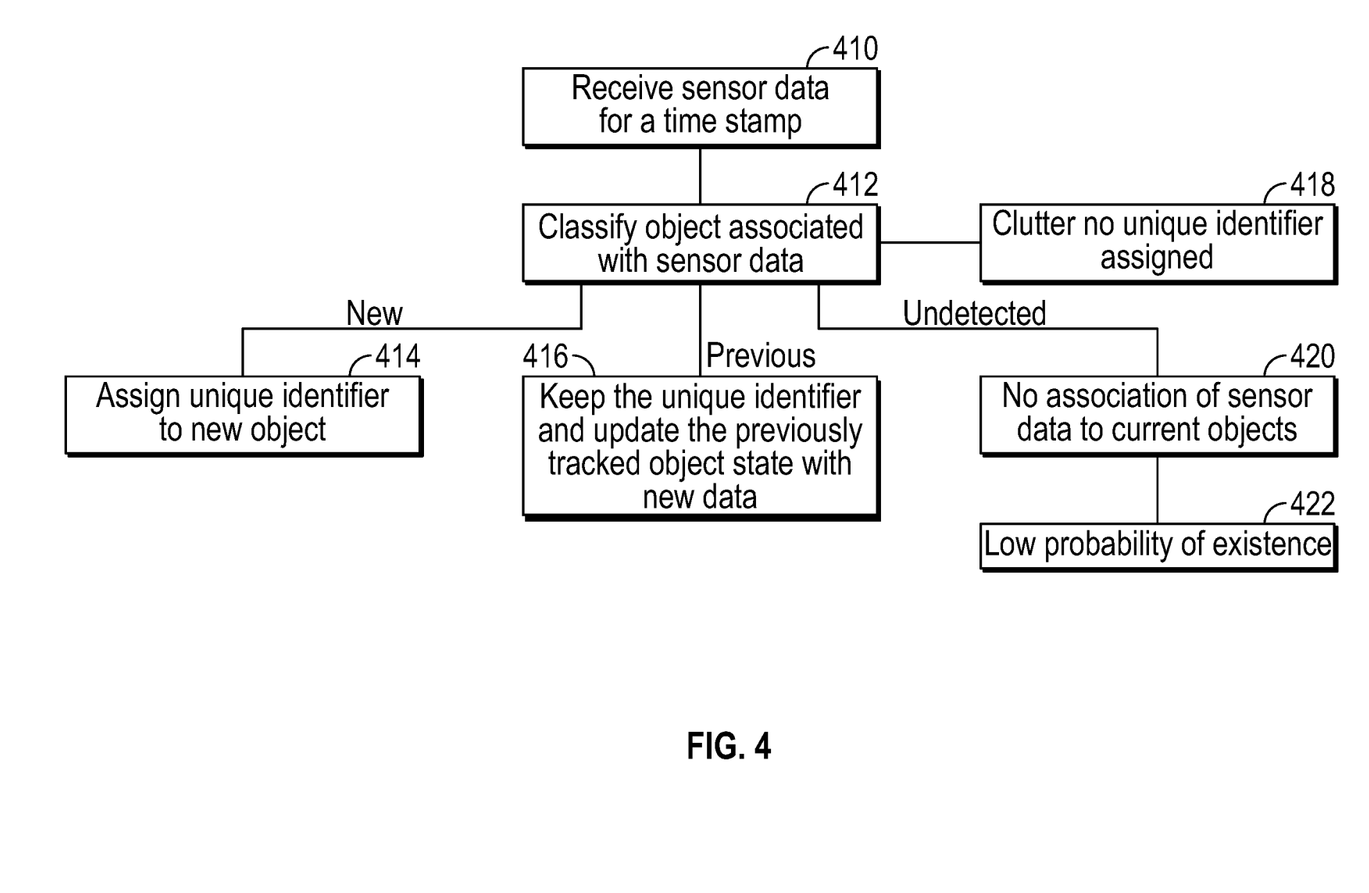
FIG. 4 is a flowchart of a high level method for classifying an object.

Referring now to FIG. 4, a brief method summary of receiving the sensor data is set forth. In step 410, the sensor data is received for a time stamp from a detector. The detector may be the bounding box determination module 20 illustrated in FIG. 1. The data received may include the bounding boxes and the center location, length, width, height and orientation/heading of the bounding box for the data.

In step 412, the object associated with the sensor data is classified. The object may be classified as a new object in step 414 and a unique identifier is associated with the new object.

In step 416, when the object is a previously tracked object, the object data is updated with the new data based upon the previous data. As mentioned above, the probability of the new data is considered in determining whether the object is new or previous. The data may also be considered clutter in step 418. No unique identifier is associated with the data.

In step 412, when the previously detected data has no current associated data, the current data is not used to update the previously detected data. However, the probability may be lowered when an object is not detected in the next time stamp in step 422.

Figure 5:
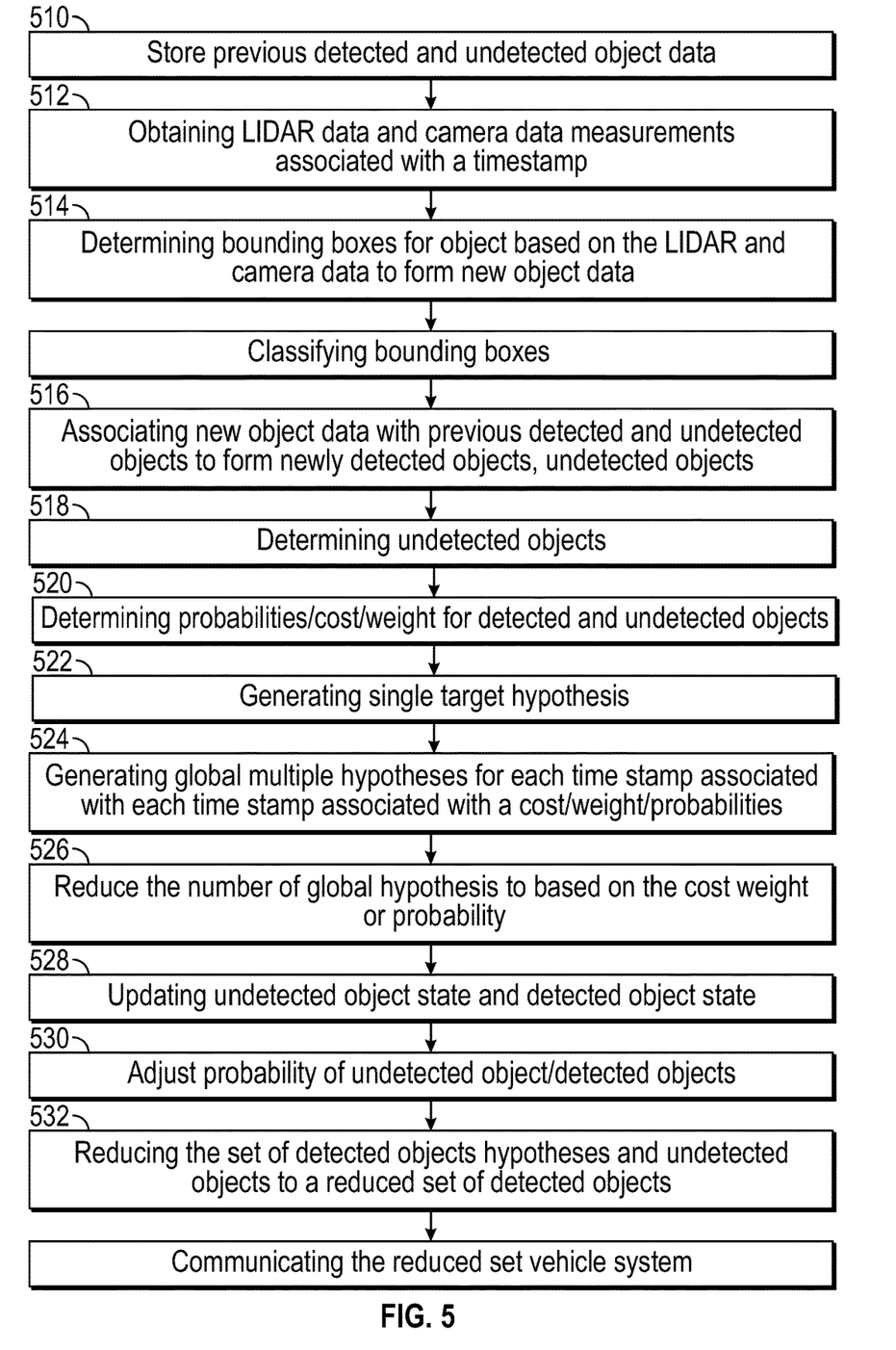
FIG. 5 is a detailed flowchart of a method for classifying an object.

Referring now to FIG. 5, a more detailed flow diagram incorporates the ideas set forth above. In step 510, previous detected and undetected object data 510 is stored within the memory 25 of the multiple object tracking module 22. As mentioned above, the memory 25 may be part of or associated with a controller that has the multiple object tracking module 22 therein. The process is a continuous process and except for the very first iteration has previously stored detected and undetected object data. The detected and undetected object data stored in step 510 are from one or more previously detected time frames with different time stamps thereon.

In step 512, lidar data and camera data measurements associated with a time stamp after the time stamps associates with the stored detected and undetected object data 510 is set forth. The lidar data and camera data are obtained from a camera and lidar. Of course, as mentioned above, other types of data may be sensed and incorporated.

In step 514, bounding boxes for each object is determined based on the lidar and camera data. As mentioned above, the bounding box determination module illustrated in FIG. 1 may be used for such determinations. Also, the previously detected and undetected object data 510 may include the bounding boxes and probabilities associated with the bounding boxes as will be described in further detail below.

In step 516, the new object data is associated with previously detected and undetected objects to form newly detected objects and updated objects. The new object data may be also classified relative to clutter or no association may be formed with certain data. In step 518, undetected objects are also identified. In step 520, probabilities, costs or weights for each detected and undetected object may be provided. Step 516-520 may be performed simultaneously or sequentially. As mentioned above, the PMBM filter may be used to obtain and associate the new object data with the previously detected objects and undetected objects. Neural networks or AI may be used to form the associations. The data is reviewed by the AI or neural networks to determine objects within a close surveillance area and whether the physics of the position of the objects is possible. This is performed on a time stamp by time stamp way. By way of example, a new object data for an object that was traveling 20 miles per hour may be positioned outside of a range and cannot be possibly positioned in one time frame a distance that corresponds to 55 miles per hour. Such data may then be moved to an undetected object as being improbable. Therefore, various probabilities may be associated with the new object data relative to the old object data based upon the PMBM filter.

Hypotheses may be generated. The hypotheses may correspond to a newly detected object, a previously detected object or clutter. These form a single target hypothesis for each object of data in step 522. In step 524, global multiple hypotheses based upon the single target hypotheses may also be generated and are associated with the cost, weight or probability. The cost, weight and probability referred to the present disclosure may be referred to generally as a probability because the costs and weight correspond directly thereto. The costs may be an inverse function of the probability but one can be discerned from the other. The global multiple hypotheses may also be determined from a neural network. An example of a hypothesis may correspond to a particular identifier and the data. For example, one vehicle may be associated with more than hypotheses. However, the costs, weight or probability may be adjusted so that the highest probability or lowest costs may be associated with the object.

In step 526, the plurality of global hypotheses may be reduced according to the cost, weight or probability. This may be referred to as pruning. The reduced plurality of global hypotheses may be performed using the Murty function described above. A small number of global hypotheses may be carried through for further processing.

As mentioned above, each of the objects being tracked have an identifier associated therewith. When new data is identified as part of a tracked object, the new data is updated and combined with the old data. In step 528, undetected object states and detected object states may be updated based upon the probability and the likelihood the data is consisted. Undetected objects may become detected objects. That is, previously detected objects may become undetected objects when no data is received for that particular object. For example, when another vehicle or obstacle blocks the view of the sensors, a particular object may not be in view for a short amount of time. However, the detected object may change to an undetected object. Likewise, previously undetected objects may become detected objects when data is received based upon the undetected object and the likelihood that the data is for the undetected object identifier. In step 530, the probability of the undetected and detected objects may be adjusted.

All of the detected and undetected objects have a probability, cost or weight associated therewith. Likewise, hypotheses have a cost, weight or probability associated therewith. The hypotheses form a first set with the detected and undetected objects. In step 532, the set of undetected objects and hypotheses are reduced to a reduced set based upon the various reduction methods described above. By way of example, the reduction methods include but are not limited to pruning, capping, gating, recycling and merging. By performing a reduction of the data set, faster processing of the data is performed. The reduced data set is ultimately communicated to various vehicles systems including but not limited to a steering system, braking system and suspension system. Thus, the various types of systems for the vehicle may be controlled based upon the multiple object tracking set forth above.

The term probability may include an actual probability of an event, a confidence score, a weighting and a cost (which is merely an inverse of the probability).

For purposes of clarity, the same reference numbers are used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:
1. A method comprising;
receiving two-dimensional sensor data and three-dimensional sensor data into a bounding box determination module;
generating three-dimensional object data in the bounding box determination module from the two-dimensional sensor data and the three-dimensional sensor data;
receiving the three-dimensional object data for boundaries of a plurality of three-dimensional objects;
performing Poisson multi-Bernoulli mixture (PMBM) filtering on the three-dimensional object data to form a filtered set of three-dimensional object data; and
utilizing the filtered set of three-dimensional object data to control operation of a vehicle system.
2. The method of claim 1 wherein the three-dimensional object data comprises an X coordinate, a Y coordinate, a Z coordinate X direction velocity, a Y direction velocity, a Z direction velocity, a heading of the object, a length of the object a width of the object and a height of the object.
3. The method of claim 2 wherein the three-dimensional object data comprises an X coordinate, a Y coordinate, a Z coordinate, a X direction velocity, a Y direction velocity, a Z velocity and a unique identifier for each object.
4. The method of claim 1 wherein performing Poisson multi-Bernoulli mixture (PMBM) filtering comprises determining detected object data and undetected object data.
5. The method of claim 4 wherein prior to unitizing the filtered set reducing the filtered set based on probabilities of the detected object data.
6. A method comprising:
storing previous detected object data and previous undetected object data, said previous detected object data and said previous undetected object data being three-dimensional data;
receiving two-dimensional sensor data and three-dimensional sensor data at the bounding box determination module;
generating three-dimensional new object data in the bounding box determination module from the two-dimensional sensor data and the three-dimensional sensor data;
receiving three-dimensional new object data associated with a current timestamp from a bounding box determination module;
comparing the three-dimensional new object data, the detected object data and the undetected object data;
forming hypotheses from the step of comparing, each hypotheses having hypothesis probability;
generating first probability data for each detected object of the new object data based on a confidence score from a neural network;
generating second probability data for each undetected object;
reducing the hypotheses based on the hypotheses probability;
generating a first set of data comprising detected objects, undetected objects and hypotheses;
reducing the first set of data comprising the detected objects and undetected objects based on the first probability, the second probability and the hypothesis probabilities to form a second set; and
utilizing the second set to control operation of a vehicle system.
7. The method of claim 6 wherein the new object data is based on lidar data and camera data.
8. The method of claim 6 wherein generating probability data for each detected object comprises generating probability data for each detected object using a multi-Bernoulli mixture independent of other detected objects.
9. The method of claim 6 wherein generating probability data for each undetected object comprises generating probability data for each undetected object using a Poisson process.
10. The method of claim 6 further comprising classifying previously undetected objects and detected objects based on the new objects data.
11. The method of claim 6 further comprising reducing the second set by pruning based on the hypothesis probability, the first probability and the second probability.
12. The method of claim 6 further comprising reducing the second set by capping a number if hypotheses and detected objects.
13. The method of claim 6 further comprising reducing the second set by recycling detected objects with low probabilities into undetected objects.
14. The method of claim 6 wherein further comprising reducing the second set by merging non-unique hypotheses.
15. The method of claim 6 wherein new object data comprises an X point and a Y point representing a center of an object.

16. A system comprising:
a camera sensor generating camera data;
a lidar generating lidar data;
a bounding box determination module generating bounding boxes from the camera data and the lidar data, at least some of said bounding boxes being three-dimensional;
a multiple object tracking module programmed to
store previous detected object data and previous undetected object data;
receive new object data associated with a timestamp, said new object data being two-dimensional object data and three-dimensional object data;
compare the new object data, the detected object data and the undetected object data;
form hypotheses from the step of comparing, each hypotheses having hypothesis probability;
generate first probability data for each detected object based on a confidence score from a neural network;
generate second probability data for each undetected object;
reduce the hypotheses based on the hypotheses probability;
generate a first set of data comprising detected objects, undetected objects and hypotheses;
reduce the first set of data comprising the detected objects and undetected objects based on the first probability, the second probability and the hypothesis probabilities to form a second set; and
utilize the second set to control operation of a vehicle system.

17. The system of claim 16 wherein the new object data is based on lidar data and camera data.

18. The system of claim 16 wherein generating probability data for each detected object comprises generating probability data for each detected object using a multi-Bernoulli mixture independent of other detected objects.

19. The system of claim 16 wherein generating probability data for each undetected object comprises generating probability data for each undetected object using a Poisson process.

20. The system of claim 16 further comprising classifying previously undetected objects and detected objects based on the new objects data.

* * * * *